United States Patent [19]

Islam

[11] Patent Number: 4,932,739
[45] Date of Patent: Jun. 12, 1990

[54] ULTRA-FAST OPTICAL LOGIC DEVICES
[75] Inventor: Mohammed N. Islam, Hazlet, N.J.
[73] Assignee: AT&T Bell Laboratories, Murray Hill, N.J.
[21] Appl. No.: 412,242
[22] Filed: Sep. 25, 1989
[51] Int. Cl.$^5$ .............................................. G02B 6/26
[52] U.S. Cl. ............................. 350/96.15; 350/96.16; 341/137
[58] Field of Search ............... 350/96.15, 96.16, 96.18, 350/96.20, 96.29, 35; 341/137; 455/610, 608, 611

[56] References Cited

PUBLICATIONS

A. Hasegawa et al., *Appl. Phys. Lett.*, vol. 23, No. 3 (1973).
N. J. Doran et al., *J. Opt. Soc. Am. B.*, vol. 4, No. 11 (1987).
C. R. Menyuk, *Optics Letters*, vol. 12, No. 8, pp. 614–616 (1987).
M. N. Islam et al., *Optics Letters*, vol. 13, pp. 518–520 (1988).
C. R. Menyuk, *J. Opt. Soc. Am. B*, vol. 5, No. 2, pp. 392–401 (1988).

*Primary Examiner*—William L. Sikes
*Assistant Examiner*—Akm E. Ullah
*Attorney, Agent, or Firm*—Gregory C. Ranieri

[57] ABSTRACT

Combinatorial (Boolean) logic functions are provided by ultrafast optical logic devices which utilize soliton trapping between two optical signals propagating in a birefringent fiber. The logic devices are three terminal devices having orthogonally polarized soliton input signals and a single output signal. Optically filtering the output from the fiber permits the desired combinatorial logic operation to be performed on the input optical signals. Logic operations include AND, exclusive-OR, NOT, and NOR functions. In operation, the devices exhibit phase insensitivity, low switching energy, high contrast ratio between output logic levels, and cascadability. In one embodiment of the invention, a first optical signal and a second optical signal are optically coupled into the principal axes of a birefringent fiber. A Fabry Perot etalon centered at the center frequency of both the first and second signals is utilized to realize a exclusive-OR operation whereas centering the etalon on the frequency related to the spectral shift caused by soliton trapping realizes an AND operation.

19 Claims, 9 Drawing Sheets

ULTRA-FAST OPTICAL LOGIC DEVICES

TECHNICAL FIELD

The present invention is related to optical devices and, more particularly, to optical logic devices.

BACKGROUND OF THE INVENTION

Optical devices have been developed in recent years to operate in conjunction with conventional transmission systems for performing complex optical signal processing. These devices can be arranged into two major classes: highly parallel devices for performing some combinatorial (Boolean) function, and relational devices, such as switches and couplers, for establishing a relation or mapping between input and output ports. While relational devices operate at high bit rates, they do so in a simplistic fashion. Generally, these devices cannot provide any "intelligent" processing since they cannot realize any Boolean operations. Parallel devices, on the other hand, while affording logic operations operate at relatively slow speeds which limit the bit rates of optical signals passing through them.

SUMMARY OF THE INVENTION

Ultra-fast, optical logic devices including AND, NOT, NOR and exclusive-OR gates are realized in a birefringent fiber by utlizing soliton trapping between two optical input signals. These optical logic devices are three terminal devices having orthogonally polarized soliton input signals and a single output signal. In operation, the devices exhibit phase insensitivity, low switching energy, high contrast ratio between output logic levels, and cascadability. Optically filtering the output signal from the birefringent fiber, which comprises the optical sum of the two input signals, permits the desired combinatorial (Boolean) logic operation to be performed on the optical input signals.

In one embodiment of the invention, a first optical data signal and a second optical data signal are optically coupled into two principal axes (fast and slow axes) of a birefringent fiber. A spectral filter centered at the frequency of both the first and second optical data signals is utilized to perform a exclusive-OR operation whereas centering the spectral filter at the frequency related to the spectral shift caused by soliton trapping realizes an AND operation. Further, the combination of a spectra filter and a polarizer provides a NOT operation on one of the optical data signals.

In another embodiment, a Mach-Zehnder interferometer configuration in combination with a spectral filter and polarizer provides an alternative means for realizing an AND operation. Still another alternative for performing an AND operation is realized by forming the Mach-Zehnder interferometer via a fiber loop mirror arrangement in combination with an optical coupler.

In still another embodiment comprising a fiber, polarization selective coupler, spectral filter and polarizer, a NOR operation can be achieved.

In accordance with the principles of the invention, the different embodiments permit all optical signals to be substantially at the same wavelength and able to propagate as solitons. As a result, the output from one optical logic device can be cascaded to the input of another optical logic device.

BRIEF DESCRIPTION OF THE DRAWING

A more complete understanding of the invention may be obtained by reading the following description of specific illustrative embodiments of the invention in conjunction with the appended drawing in which.

DETAILED DESCRIPTION

Figure 1:
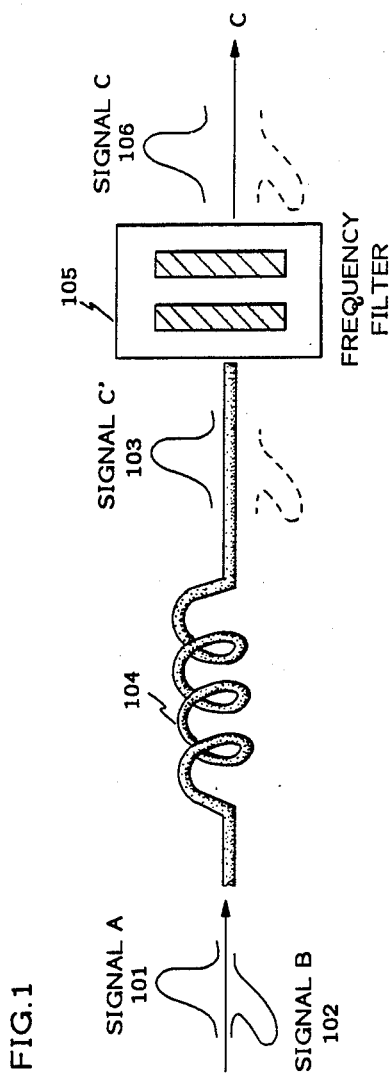
FIGS. 1, 6, 7, 8, and 9 show exemplary embodiments of optical logic devices in accordance with the principles of the invention including a exclusive-OR, INVERTER, AND, and NOR gates.

Optical logic devices including a exclusive-OR, INVERTER, AND, and NOR gates have been constructed in accordance with the principles of the invention. The optical logic devices utilize the trapping of orthogonally polarized solitons propagating in a birefringent optical fiber. Therefore, before describing the inventive optical logic devices, it will be instructive to discuss briefly both the nature of solitons and soliton trapping.

Fourier transform limited optical pulses propagating through an optical fiber experience pulse spreading due to a variation of group velocity called group velocity dispersion. Group velocity dispersion results from a linear dependence of the index of refraction on spectral frequency. That means, different spectral portions of an optical pulse travel at a different group velocity which, in turns, leads to a temporal broadening of the propagating optical pulse. Additionally, the fiber has a third-order nonlinear effect (self-phase modulation) in which its refractive index, n, depends on the light intensity, I, through the formula, $n = n_0 + n_2 I$, where $n_0$ is the linear refractive index and $n_2$ is the nonlinear refractive index. Balancing the negative group velocity dispersion with this nonlinear, intensity dependent effect gives rise to the formation of a soliton in the fiber. An input optical field of the form given by $u = (1+a) \operatorname{sech}(t)$ contains a fundamental soliton when the amplitude, a, lies in the range of $-\frac{1}{2} < a < \frac{1}{2}$. Furthermore, the peak power, $P_1$, of an optical pulse with pulse duration, $\tau$, required to generate a single soliton in a single-mode fiber with effective-mode field area $A_{eff}$ is given by $$P_1 = \frac{\lambda A_{eff}}{4 n_2 Z_0}, \tag{1}$$

$$Z_0 = \frac{0.322 \pi^2 c \tau^2}{\lambda^2 |D|}, \tag{2}$$

where $P_1$ is the fundamental soliton power, $Z_0$ is the soliton period, and D is the dispersion in psec/nm.Km. For a more detailed explanation of solitons, see Hasegawa et al., *Appl. Phys. Lett.*, Vol. 23, No. 3, pp. 142-44, (1973).

While solitons are nonlinear optical pulses that propagate in the anomalous regime (D>0) of the fiber without dispersing, solitons having different polarization states can still travel at a different group velocity ("walk-off") due to the birefringence of the fiber. Birefringence is that property of a material which cause two different polarization states to propagate at different velocities because the material has an ordinary and extraordinary index of refraction, i.e., a different refractive index for each polarization state.

Recently, it has been shown in principle that orthogonally polarized solitons can trap one another and travel as a unit because of an intensity dependent effect that compensates for the birefringence. See C. R. Menyuk, *Optics Letter*, Vol. 12, No. 8 pp. 614–6 (1987) and C. R. Menyuk, *J. Opt. Soc. Am. B.*, Vol. 5, No. 2 pp. 392–402 (1988). Specifically, two solitons shift their center spectral frequency in opposite directions such that through group velocity dispersion the soliton along the fast axis slows down while the soliton along the slow axis speeds up. As the group velocity of each soliton reaches equilibrium, the solitons travel as an unit. Additionally, the trapped soliton pair appears at the output of the fiber at a time, $t+\Delta t$, where t is the time at which a single soliton would have appeared at the output.

For instance, 300 fsec soliton pulses ($\lambda = 1.685$ µm) orthogonally polarized and propagating in a fiber, which has a polarization dispersion $\Delta B'$ of 80 psec/km, each shifts its spectral frequency by 0.52 THz. The spectral shift of each soliton, however, is in an opposite direction with respect to the spectral shift of the other soliton. For a given birefringence and fiber length, a minimum intensity is required for trapping to occur within the fiber. In this example, pulses having an energy of ~42 pJ are required for trapping to occur in a 20 meter length of fiber.

Various optical logic devices requiring no critical biasing have been constructed utilizing the principle of soliton trapping described hereinabove. It is contemplated that the inputs are optical signals represented by pulses and of sufficient amplitude for propagating as solitons within a fiber. Moreover, the solitons should have substantially the same wavelength, i.e., the same spectral frequency. Other than the different polarization states between optical inputs, no other physical distinction exists between them. The optical inputs may be coupled into the devices by optical lenses, couplers, or by fibers which utilize, for example, biconical connectors. In addition, the operation is insensitive to the relative phase between the inputs and, in principle, the the output from one device can be cascaded to the input of another device.

Shown in FIG. 1 is a exemplary three terminal optical device in accordance with the principles of the invention for performing a exclusive-OR function. The device has two optical inputs and one optical output. During the operation of the optical device, it is understood that soliton trapping occurs within birefringent fiber 104 between individual data pulses of input optical signal 101 (data signal A) and input optical signal 102 (data signal B). Therefore, when performing the exclusive-OR function on data signals A and B, the device performs it on individual pulses of signals A and B. That is, the optical device performs a exclusive-OR function as $f(A,B) = A \oplus B$. Optical signal 103 (signal C') represents the optical combination of data signals A and B. Furthermore, optical signal 101 is orthogonally polarized to optical signal 102. Standard polarizers and polarization rotation devices (not shown) may be used in obtaining the desired input signal polarization. With frequency filter 105 positioned at the output of fiber 104, filter 105 extracts optical signal 106 (data signal C) representing the exclusive-OR function of signals A and B. Filter 105 may be a Fabry Perot etalon, a diffraction grating, or the like. These filters may be formed using discrete elements, such as fibers, or may even be integrated on a substrate.

Figure 2:
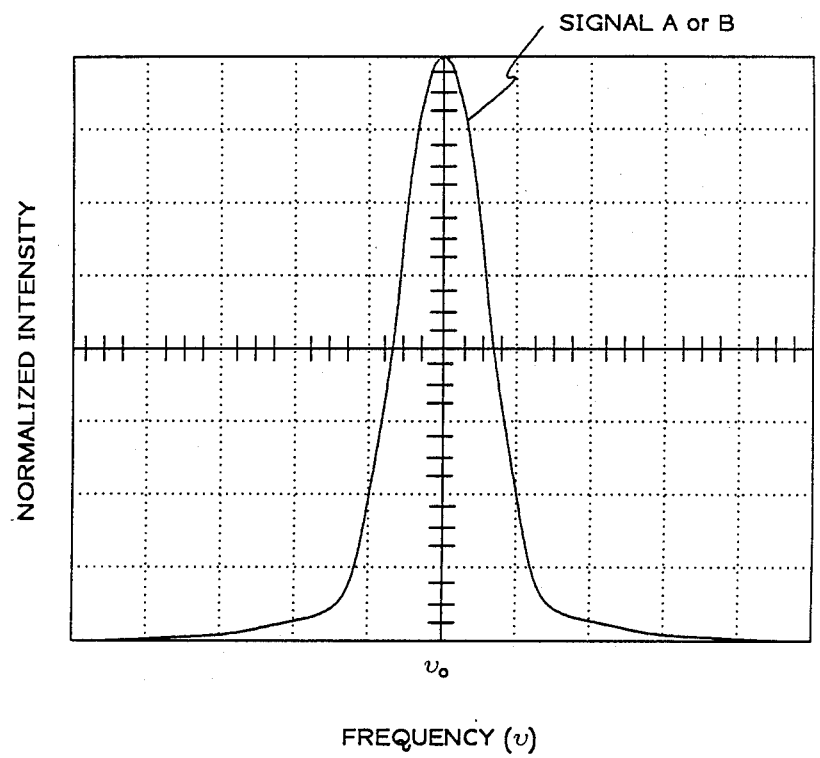
FIGS. 2-5 are graphs of the normalized intensity versus frequency profiles of input and output optical signals for the optical device shown in FIG. 1.

In order to understand the operation of this device, attention should be directed to FIGS. 2 through 5 in conjunction with FIG. 1. A description of the operation for a exclusive-OR function follows below. It is to be understood that the presence of either optical signal A or optical signal B having sufficient amplitude to form a soliton within fiber 104 is to be regarded as a logical "1" whereas an absence or dispersive wave amplitude of optical signal A or optical signal B represents a logical "0". FIG. 2 shows the frequency spectrum of optical signals 101 or 102 which have a logical "1" level. Optical signals 101 and 102 have a center spectral frequency of $\nu_0$. It should be noted that the wavelength, $\lambda$, is related to the frequency, $\nu_0$, by the following relationship: $\lambda = c/\nu_0$. Hence, reference made to frequency is to be understood to encompass a reference in the alternative to wavelength via the relationship above.

Figure 3:
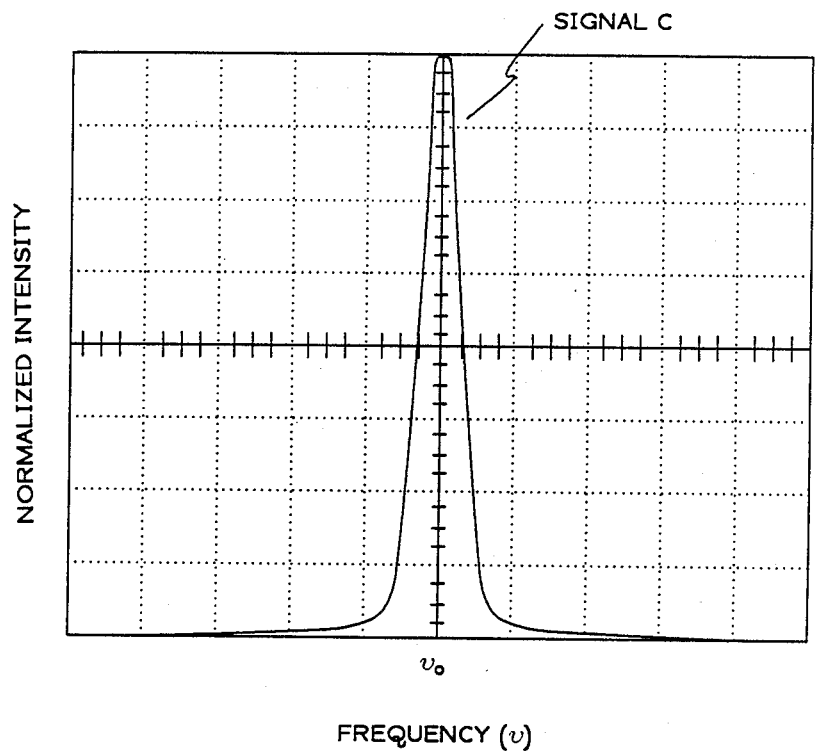

With filter 105 centered nominally at the center spectral frequency of optical signals 101 and 102 and either siganl A or B present, the amplitude of transmitted optical signal 106 (signal C) is substantially equal to that of optical signal 101 or 102. FIG. 3 shows the frequency spectrum of optical signal 106 for this particular case. Although the input and output center frequencies coincide, their spectral widths may differ depending on the frequency band pass of filter 105. For a pair of coincident data signals A and B, soliton trapping occurs between the two optical input signals. Accordingly as discussed above, the spectral peak of each data signal shifts by a spectral frequency $\Delta\nu_0$ within fiber 104 in order to compensate for polarization dispersion. The spectral shift is dependent on the group velocity dispersion, polarization dispersion, and length of fiber 104 along with the spectral frequency of optical signals 101 and 102. A close approximation to the spectral shift is given by $$\Delta\lambda \sim \frac{\Delta\beta'}{2D},$$

where $\Delta\lambda$ is wavelength shift of each soliton, $\Delta\beta'$ is the polarization dispersion in psec/km and D is the group velocity dispersion in psec. $(nm.km)^{-1}$.

Figure 4:
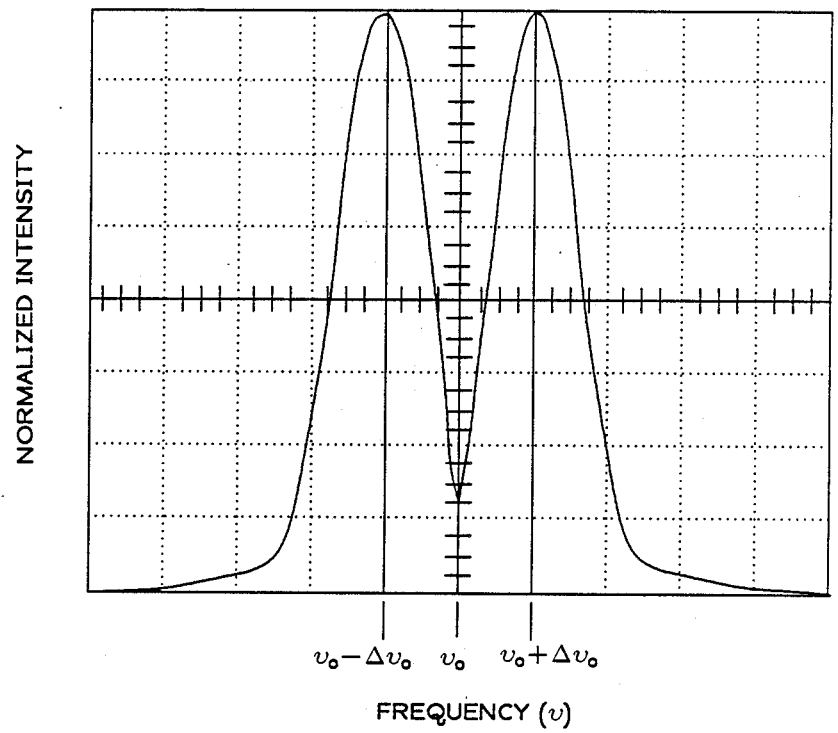
Figure 5:
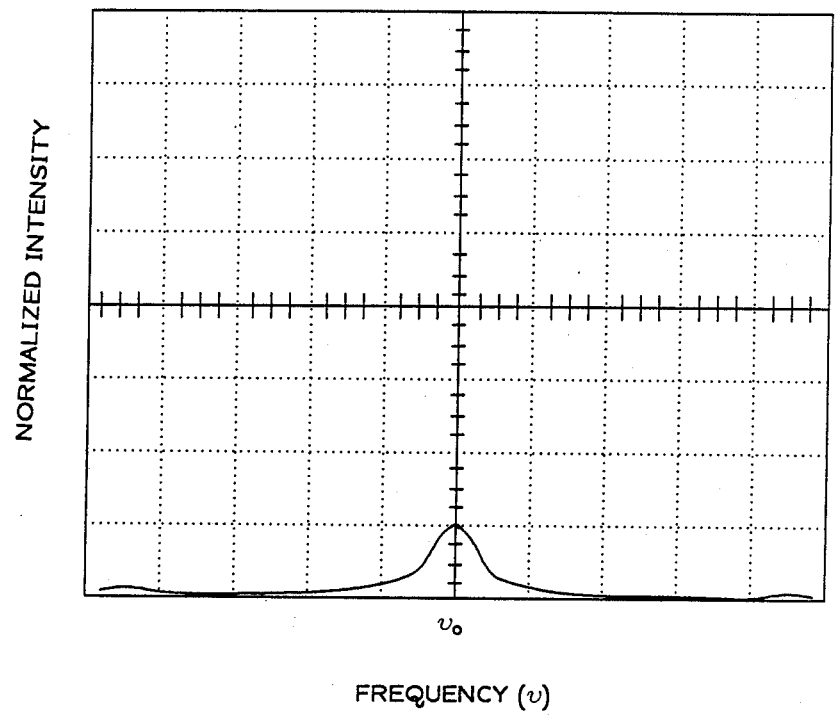

Illustrated in FIG. 4 is the frequency spectrum of signal C' showing the spectral shifts of optical signals 101 and 102. It should be clear that when both data signals A and B are at a logical "1", output data signal C' is substantially rejected by spectral filter 105 due to the spectral shift in frequencies of both data signals A and B. Shown in FIG. 5 is the frequency spectrum for data signal C at a logical "0" output level. Referring to specifically FIGS. 3 and 5, the greater normalized intensity level is the logic "1" output level and the other is the logic "0" output level. The two output logic levels are not a function of absolute intensity, but rather a function of relative intensity between the amplitude levels of data signal C. Based on the discussion above, it is should be clear to those skilled in the art that the optical device operates as a exclusive-OR gate. That is, when either optical signal A or B, but not both, is at a logical "1" does optical signal 103 able to be transmitted through filter 105. Hence, the device operates in accordance with the truth table provided below.

| Output | Input | |
|---|---|---|
| C | A | B |
| 0 | 0 | 0 |
| 1 | 0 | 1 |
| 1 | 1 | 0 |
| 0 | 1 | 1 |

By placing a polarizer (not shown) in cascade with filter 105, the optical device shown in FIG. 1 may be converted to operate as an Inverter (NOT). The polarizer may take on different configurations, but these configurations all are based on some physical mechanism that selects a particular polarization state and discards all others. Specifically in this case, the polarizer transmits only an optical signal having the same polarization state as optical signal 102 (signal B). With signal B held at a logical "1", the output optical signal transmitted through the polarizer is logically opposite to the level of data signal A. That is, the optical device now performs the Boolean function $f(A)=\overline{A}$.

When the center band pass frequency of filter 105 is centered at either spectral frequency $\nu+\Delta\nu_0$ or $\nu-\Delta\nu_0$, the optical device shown in FIG. 1 performs an AND function: $f(A,B)=A\cdot B$. That is, only when data signals A and B are present does soliton trapping occur and, hence, optical signal 103 able to be transmitted through filter 105. An AND function is thus achieved in accordance with its truth table which is provided below.

| Output | Input | |
|---|---|---|
| C | A | B |
| 0 | 0 | 0 |
| 0 | 0 | 1 |
| 0 | 1 | 0 |
| 1 | 1 | 1 |

Although the center frequency of data signal C is different from both data signals A and B, the device is still cascadable. The added complexity is that the center frequencies of filters in subsequent devices must be shifted and alternated from $\nu+\Delta\nu_0$ to $\nu-\Delta\nu_0$.

Figure 6:
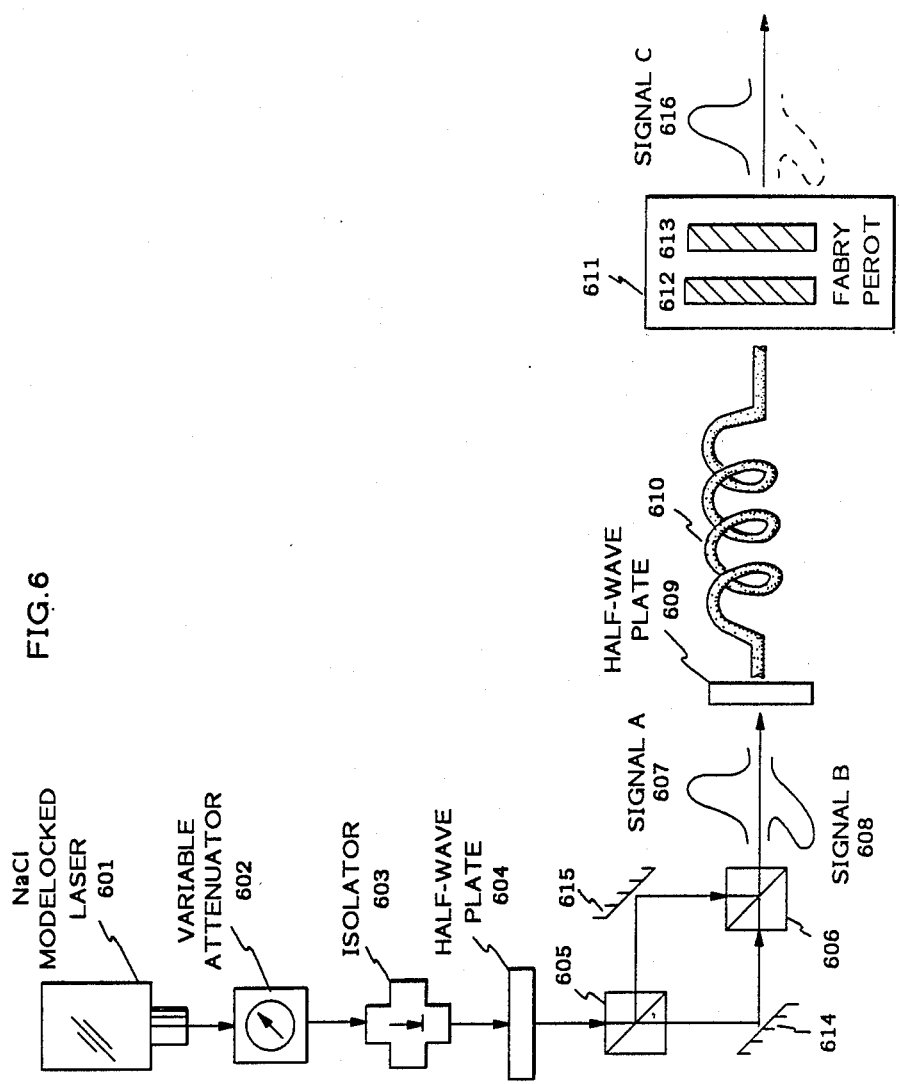

In an example from experimental practice, optical pulses having a 300 fsec width and a wavelength of 1.685 μm were used as optical signals 607 (signal A) and 608 (signal B) for demonstrating the exclusive-OR function, $f(A,B)=A\oplus B$. Referring to FIG. 6, optical beams 607 and 608 were obtained from multiple quantum well passively modelocked Na:Cl color center laser 601. In order to adjust the input power to birefringent fiber 610, variable attenuator 602 was positioned after laser 601. Lenses used to couple the optical signals into and out of fiber 610 are not shown. Also, it should be noted that fibers having optical connectors may be utilized to optically couple into the principal axes of fiber 610. Birefringent fiber 610 was approximately 20 meters in length having a polarization dispersion of 80 psec/km, a zero dispersion wavelength of 1.51 μm and a dispersion slope of 0.05 psec/km.nm². Also, optical isolator 603 prevented feedback into laser 601. Polarizing beam splitters 605 and 606 in combination with mirrors 614 and 615 separated and recombined optical pulses from laser 601 for generating optical signals 607 and 608. Half-wave plate 604 adjusted the amplitudes of signals A and B to be substantially equal whereas half-wave plate 609 aligned the polarization states of signals A and B along the desired fiber axes. Mirrors 612 and 613 (85% reflecting) are arranged to form a Fabry Perot etalon which served as frequency filter 611. With the spacing between mirrors 612 and 613 adjusted to 75 μm, the etalon had a finesse of 20 and a band pass frequency, $\Delta\nu$, of ∼ 0.2 THz. In this case, the Fabry Perot etalon was adjusted to have a center band pass frequency coincide with the center frequency of optical signals 607 and 608. When either data signal A or B (∼ 42 pJ pulse) was only incident on fiber 610, optical signal 616 broaden temporally from 300 fsec to 620 fsec and no spectral shift was observable. However, when data signals A and B were temporally coincident, a frequency splitting of approximately 1.03 THz was observed between the spectral peak of optical signals 607 and 608 resulting from the phenomenon of soliton trapping. Moreover, the trapped pulses (signals A and B) narrow in the center to 400 fsec. A high contrast ratio between a logical "0" and "1" at the output of the filter 611 was obtained. Particularly, a 8:1 contrast ratio was measured. That is, with either signal A or B present, the amplitude of optical signal 616 (signal C) was 8 times greater than when A and B were present together.

It should be noted that although the frequencies of optical signals 607, 608 and 616 were substantially the same, optical signal 616 temporally broaden to approximately the inverse of the frequency bandpass, $1/\Delta\nu$, of filter 611. In order to cascade to another device, data signal C should be able to propagate as a soliton. This would require widening the filter's band pass which lowers the constrast ratio between the logic output levels. For example, using 70% reflecting mirrors (bandpass ∼ 0.58 THz), the contrast ratio of the logic output levels was reduced to 5:1.

Figure 7:
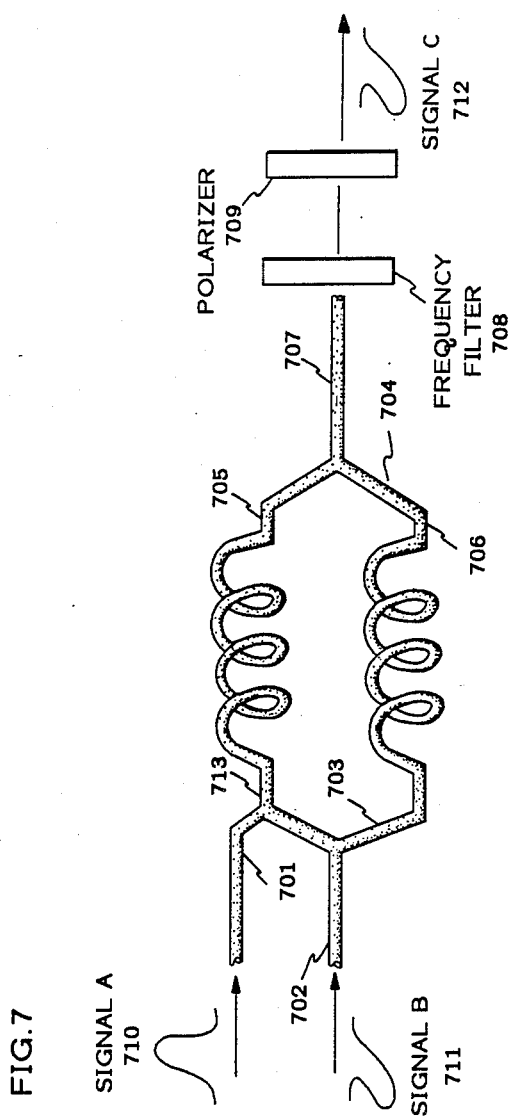

FIG. 7 illustrates an alternative embodiment for an AND optical device that does not shift the output signal frequency. This embodiment utilizes a Mach-Zehnder interferometer. In a Mach-Zehnder interferometer, an input optical signal is bifurcated into two separate optical path supporting slightly different propagation constants to produce a desire effect. For example, an optical signal is injected into an input fiber and divided a distance away into two branch fibers by a signal splitting Y-branch. The propagation constants for one or both of the fiber branches are adjusted to achieve a relative phase difference between the optical signal within each branch fiber when they are coupled into an output fiber by a recombining Y-branch.

As shown in FIG. 7, the Mach-Zehnder interferometer comprises input fibers 701 and 702, signal splitting Y-branch 703, coupler 713, recombining Y-branch 704, interferometer arm fibers 705 and 706, and output fiber 707. Also shown with the interferometer are frequency filter 708 and polarizer 709. The interferometer in combination with filter 708 and polarizer 709 comprises the AND logic device. Frequency filter 708 has a band pass frequency centered on the center frequency of optical signals 710 (data signal A) and 711 (data signal B). Polarizer 709 is aligned to transmit an optical signal having the same polarization state as optical beam 711. In addition, the propagation constants of the arms of the interferometer are adjusted so that when data signal B is present alone, the relative phase difference between the two arms, 705 and 706, leads to destructive interference, producing a null or zero at the output of combining Y-branch 704. Data signal A present by itself propagates through filter 708, but is blocked by polarizer 709 since "A" does not have the correct polarization state.

Soliton trapping only occurs in arm 705 when data signal A and data signal B are present. Consequently, when the optical signals in fiber arms 705 and 706 recombine, they do not destructively interfere since they are both spectrally and temporally offset as a result of soliton trapping occurring in arm 705. Data signal B within arm 706, thus, passes through both filter 708 and polarizer 709. Accordingly, the operation of the optical device is of an AND function, i.e. data signal C is a logical "1" only when data signals A and B are each a logical "1".

Figure 8:
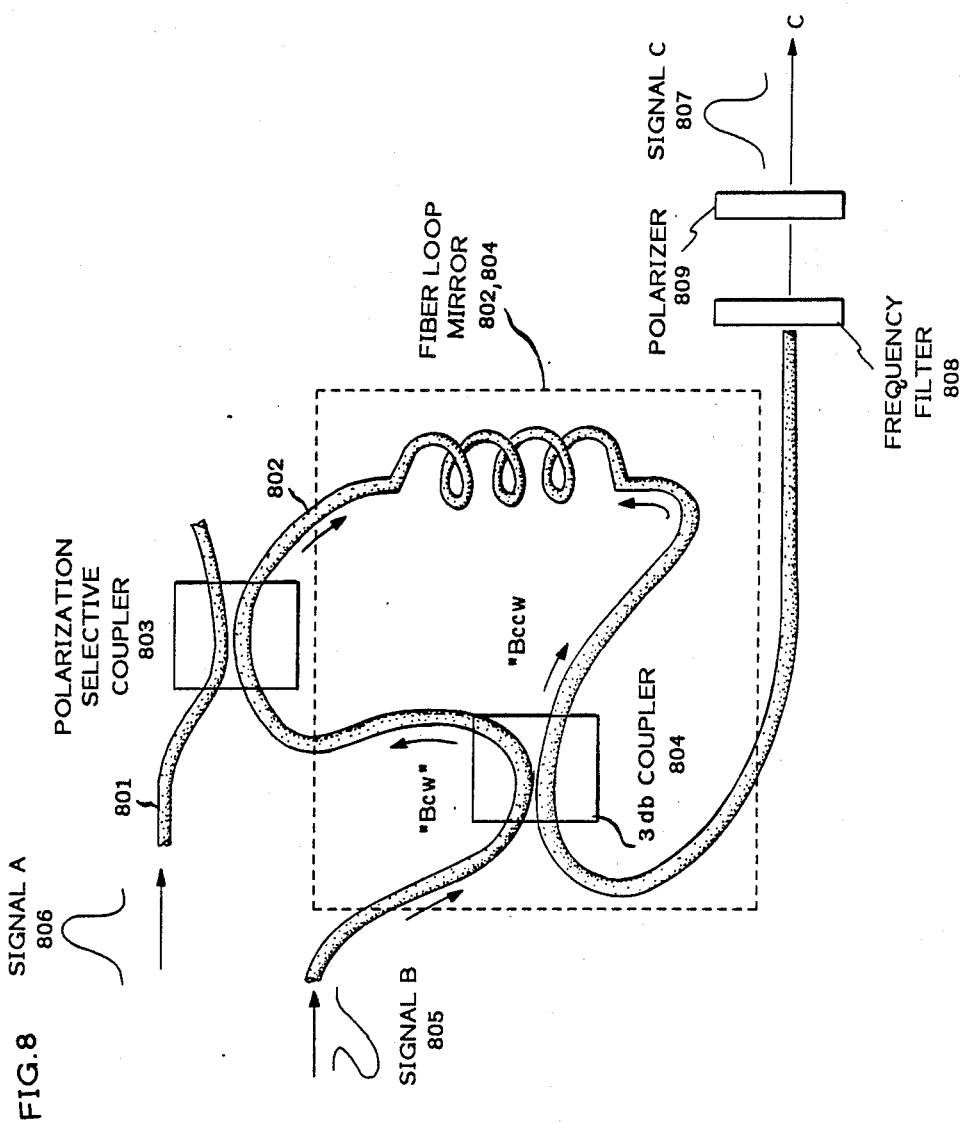

FIG. 8 illustrates still another alternative embodiment for an AND optical device. The Mach-Zehnder interferometer is formed by a fiber loop mirror arrangement comprising fiber 802 and 3 dB coupler 804. Input optical beam 805 (signal B) is bifurcated into two optical signals, $B_{cw}$ and $B_{ccw}$, effected by 3 dB coupler 804. A clock-wise propagation path (associated with signal "$B_{cw}$") and a counterclock-wise propagation path (associated with signal "$B_{ccw}$") in fiber 802 constitute the two arms of the interferometer as indicated by the arrows in FIG. 8. Also shown with the fiber loop mirror are frequency filter 808, polarization selective coupler 803, and polarizer 809. The band pass frequency of filter 808 is centered on the frequency of input optical signals 806 (signal A) and 805 (signal B). As in previous embodiments, the two input optical signals are orthogonally polarized with respect to each other. Polarizer 809 is aligned to transmit an optical signal having the same polarization state as optical signal 805 (signal B). Data signal A present by itself is coupled from fiber 801 into a clockwise propagation arm of fiber loop mirror 802 by polarization selective coupler 803. Although transmitted through filter 808, data signal A is blocked by polarizer 809 since it does have the correct polarization state. The fiber loop mirror is adjusted so that when data signal B is present, the relative phase difference between bifurcated data signal $B_{cw}$ and $B_{ccw}$ leads to destructive interference, producing a null or zero at the output of coupler 804. Soliton trapping only occurs in fiber 802 between data signals A and $B_{cw}$ when data signals A and B are present. As a result, when data signals A and B ($B_{cw}$ and $B_{ccw}$) recombine at coupler 804 they do not destructively interfere due to both spectral and temporal shift in the signals "A" and "$B_{cw}$". One of the bifurcated signal of B ($B_{ccw}$), thus, is able to propagate through filter 808 and polarizer 809. An AND operation represented by output optical beam 807 (signal C) is thus performed on data signals A and B.

Figure 9:
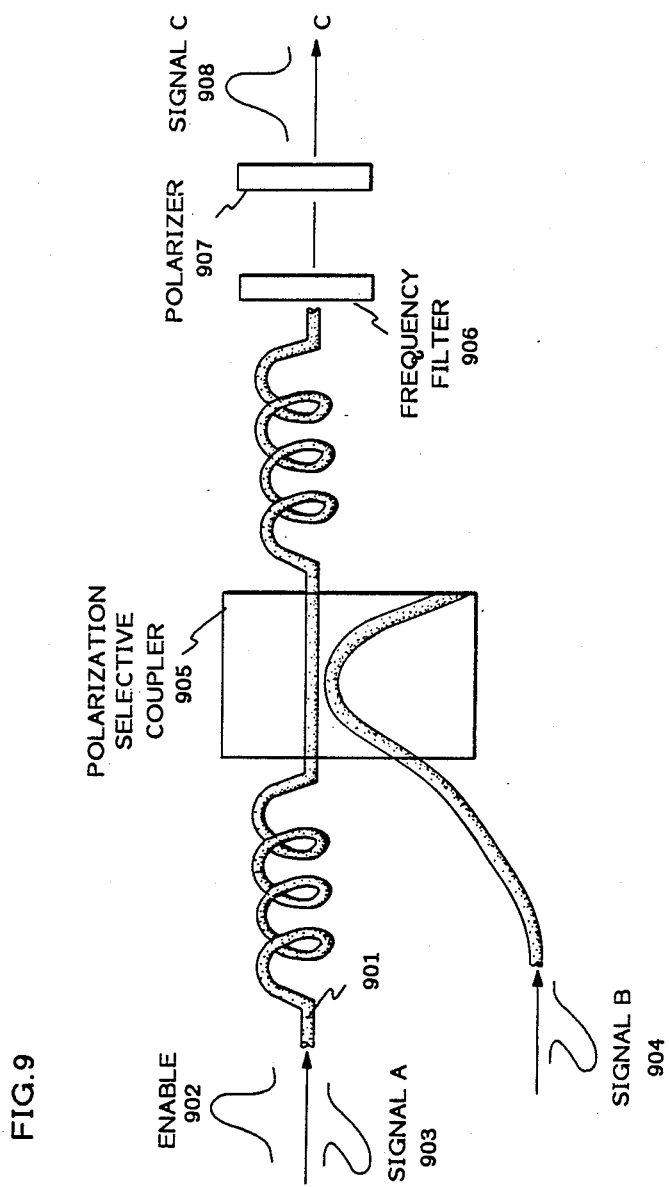

In addition to the various embodiments above, an optical device performing a NOR operation may be constructed in accordance with the principles of the invention. As shown in FIG. 9, the optical device comprises fibers 901, 909 and 910, polarization selective coupler 905, filter 906 and polarizer 907. Optical signals 903 (data signal A) and 904 (data signal B) are orthogonally polarized to optical signal 902 ("enable" signal). The center band pass frequency of filter 906 is coincide with the center frequency of optical signals 902, 903, and 904. Furthermore, polarizer 907 transmits only an optical signal having the same polarization state as optical signal 902. It is further contemplated that optical signal 902 is temporally coincide with optical signals 903 and 904. In other words, optical signal 902 is coincide with optical signal 903 at the input of fiber 901 and optical signal 902 is coincide with optical signal 904 at polarization selective coupler 905. The operation of the device is as follows. In the absence of optical signals 903 and 904, optical signal 902 propagates through filter 906 and polarizer 907. Optical signal 908 (data signal C) having a large intensity, thus, appears at the output of polarizer 907. When optical signal 903 is present together with optical signal 902 ("enable" signal), soliton trapping occurs between pulses comprising these optical signals in fiber 901. Accordingly, a spectral shift occurs for optical signals 902 and 903 and a null or zero appears on optical signal 908. Similarly, if only optical signals 902 and 904 are coincide, optical signal 904 coupled by polarization selective coupler 905 traps with optical signal 902 in fiber 910 so that a null is detected at the output of polarizer 907. The presence of all three optical signals, 902, 903 and 904, yields a zero output for optical signal 908. In this case, soliton trapping occurs within fiber 901 between optical signals 902 and 903 and, accordingly, optical signal 904 does not interact with either optical signals 902 or 903 due to their differing frequencies and timing. Therefore, neither optical signal 902, 903 nor 904 is able to propagate through the filter combination 906 and 907. If follows that the device performs a NOR function on optical signals A and B: $f(A,B) = \overline{A+B}$.

For a device to be cascadable, the output signal desirably propagates as a soliton in an input fiber of a subsequent optical device. In the range of amplitudes for $-\frac{1}{2} < a < \frac{1}{2}$, the soliton adiabatically reshapes to form a $\pi$-area pulse with an asymptotic soliton electric field $u_\infty = (1+2a)$ sech $[(1+2a)t]$. For a $<0$, the soliton broadens in the fiber and, for a $>0$, the soliton narrows. An exemplary method, then, for providing cascadability is to require the logic "1" output level of one device to fall within the range of $-\frac{1}{2} < a < \frac{1}{2}$ and the logic "0" output level to fall with the range a $< -\frac{1}{2}$.

With respect to birefringence consideration for the fibers, it should be noted that for soliton trapping to occur between two orthogonally polarized solitons, the separation between the two solitons after a distance, $Z_0$, should be less than or comparable to the pulse width, $\tau$, of the input optical signals. That means, $\Delta\beta' \cdot Z_0 \leq \tau$, where $\Delta\beta'$ is the polarization birefringence and is approximately given by $\Delta n/c$ ($\Delta n$ is the refractive index difference between the ordinary and extraordinary refractive indices).

Various other modification may be made by those skilled in the art which will embody the principles of the invention and fall within the spirit and scope thereof. For instance before cascading an output optical signal from one device to an input of a similar device, the optical signals may be amplified by Raman amplification in another length of fiber. See, for example, L.F. Mollenauer et al., *Opt. Lett.*, Vol. 10 No. 5 pp. 229–31 (1985). Using Raman amplification, the output optical signal may be restored to the original shape and intensity of the input optical signal. Advantageously, the tendency of a fundamental soliton to approach a constant $\pi$ area is useful for logic level restoration. That is, as the output optical signal is amplified, a logic "0" signal remains a dispersive wave whereas a logic "1" signal narrows and non-soliton parts are stripped away from the pulse.

I claim:

1. An optical logic device for performing Boolean logic operations on first and second optical signals, said optical logic device comprising:

dielectric waveguide means responsive to said first and second optical signals for causing soliton trapping to occur between individual pulses of said first and second optical signals, said first optical signal polarized substantially orthogonal to said second optical signal;

means for coupling optically said first and second optical signals to an input end of said dielectric waveguide means and;

means coupled optically to an output end of said dielectric waveguide means for filtering a predetermined spectral region of said first and second optical signals.

2. The optical logic device as defined in claim 1 wherein said means for coupling includes means for polarizing said second optical signal substantially orthogonal to said first optical signal.

3. The optical logic device as defined in claim 2 wherein said means for filtering includes an Fabry-Perot etalon.

4. The optical logic device as defined in claim 3 wherein said dielectric waveguide means includes an optical fiber.

5. The optical logic device as defined in claim 4 wherein said predetermined spectral region is centered at the wavelength of said first and second optical signals, such that said Boolean logic operation is a Exclusive-OR function.

6. The optical logic device as defined in claim 4 wherein said predetermined spectral region is centered at the spectral shift wavelength due to said soliton trapping of said first and second optical signals, such that said Boolean logic operation is an AND function.

7. The optical logic device as defined in claim 3 further comprising means coupled optically to said output end for transmitting a predetermined polarization state of said first and second optical signals, said predetermined polarization state being substantially the same as that of said second optical signal and said predetermined spectral region centered on the wavelength of said first and second optical signals, such that said Boolean logic operation is an AND function.

8. The optical logic device as defined in claim 7 wherein said dielectric waveguide means includes first and second separate optical paths for supporting optical signal propagation on each of said optical paths.

9. The optical logic device as defined in claim 8 further comprising means for coupling said first optical signal to said first optical path, means for coupling said second optical signal to each of said first and second optical paths, and means for combining said first and second optical paths into an output signal.

10. The optical logic device as defined in claim 9 wherein said dielectric waveguide means includes first and second optical fibers corresponding to said first and second separate optical paths, respectively.

11. The optical logic device as defined in claim 9 wherein said dielectric waveguide means includes an optical fiber, said first and second optical paths corresponding to counterpropagating directions within said optical fiber.

12. An optical logic device for performing a NOR Boolean logic operation on a first and second optical signals, said optical logic device comprising:

dielectric waveguide means responsive to said first and second optical signals, and a third optical signal, for causing soliton trapping to occur between individual pulses of said first and third optical signals, and said second and third optical signals in the absence of said first optical signal, said third optical signal polarized substantially orthogonal to said first and second optical signals;

means for coupling optically said first, second and third optical signals to an input end of said dielectric waveguide;

means coupled optically to an output end of said dielectric waveguide means for filtering a predetermined spectral region of said first, second and third optical signals, said predetermined spectral region centered on the wavelength of said first and second optical signals; and means coupled optically to said output end for transmitting a predetermined polarization state of said first and second optical signals, said predetermined polarization state being substantially the same as that of said third optical signal.

13. The optical logic device as defined in claim 12 wherein said means for coupling includes means for polarizing said third optical signal substantially orthogonal to said first and second optical signals.

14. The optical logic device as defined in claim 13 wherein said means for filtering includes a Fabry-Perot etalon.

15. The optical logic device as defined in claim 14 wherein said dielectric waveguide means includes an optical fiber.

16. An optical logic device for performing a NOT Boolean logic operation on a first optical signal, said optical logic device comprising:

dielectric waveguide means responsive to said first and second optical signals for causing soliton trapping to occur between individual pulses of said first and second optical signals, said first optical signal polarized substantially orthogonal to said second optical signal;

means for coupling optically said first and second optical signals to said dielectrical waveguide means;

means coupled optically to an output end of said dielectric waveguide means for filtering a predetermined spectral region of said first and second optical signals, said predetermined spectral region centered on the wavelength of said first and second optical signals; and means coupled optically to said output end for transmitting a predetermined polarization state of said first and second optical signals, said predetermined polarization state being substantially the same as that of said second optical signal.

17. The optical logic device as defined in claim 16 wherein said means for coupling includes means for polarizing said control optical signal substantially orthogonal to said first optical signal.

18. The optical logic device as defined in claim 17 wherein said means for filtering includes a Fabry-Perot etalon.

19. The optical logic device as defined in claim 18 wherein said dielectric waveguide means includes an optical fiber.

* * * * *